Aug. 8, 1961     E. ROBBART     2,995,470
METHOD AND APPARATUS FOR TREATING CONTINUOUS LENGTHS
OF MATERIAL WITH GASEOUS COMPOSITIONS
Filed July 16, 1958     2 Sheets—Sheet 1
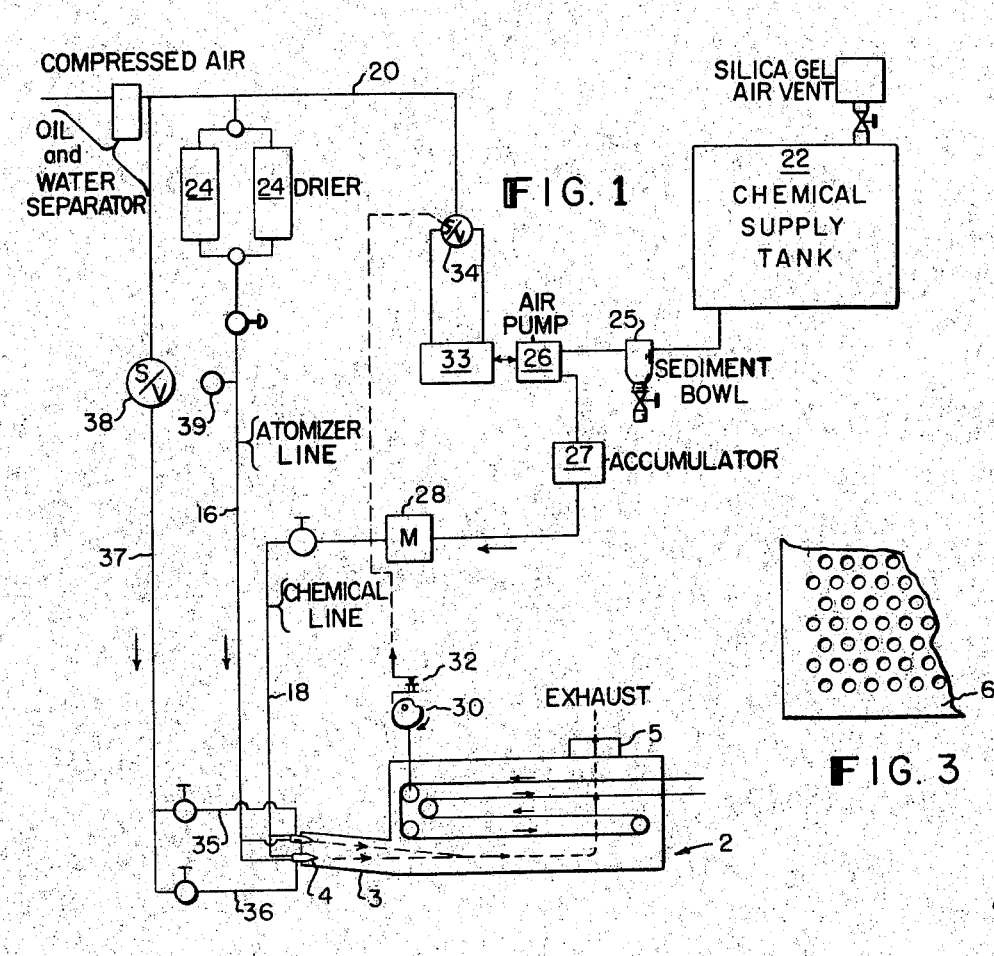
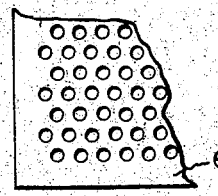
FIG. 3
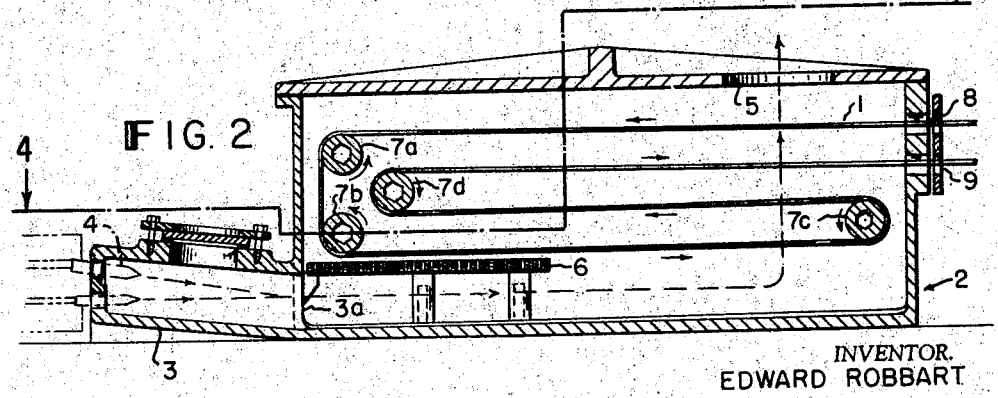
INVENTOR.
EDWARD ROBBART
BY
KENWAY, JENNEY, WITTER & HILDRETH
ATT'YS.

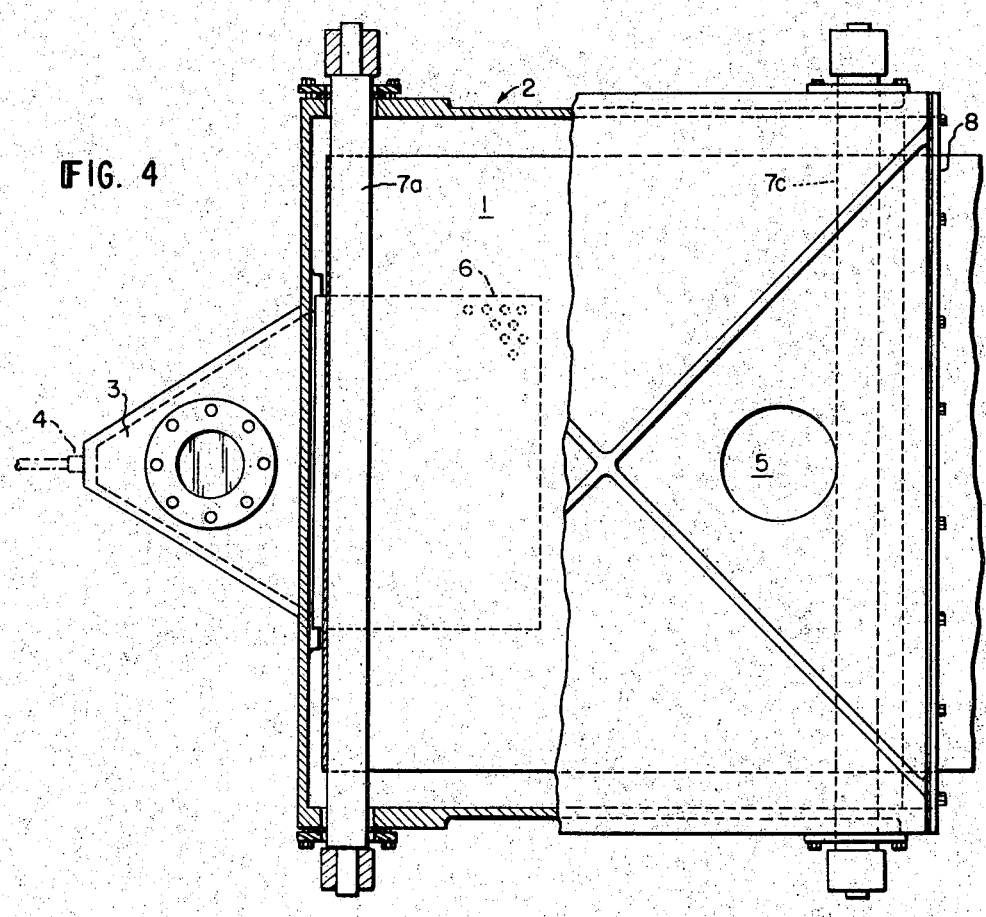

United States Patent Office 2,995,470
Patented Aug. 8, 1961

2,995,470
METHOD AND APPARATUS FOR TREATING CONTINUOUS LENGTHS OF MATERIAL WITH GASEOUS COMPOSITIONS
Edward Robbart, Watertown, Mass.
(321 Fairmount Ave., Milton 86, Mass.)
Filed July 16, 1958, Ser. No. 748,905
7 Claims. (Cl. 117—106)

This invention relates to the treatment of continuous lengths of material, such as fabrics, paper, filaments, yarns, and the like, with gaseous compositions, particularly vapors of reagents reactive with the material to form gaseous by-products which are desirably eliminated.

The invention is aimed generally in providing a method and apparatus for treating materials at a constantly uniform vapor concentration under controlled conditions for constantly replenishing the vapor component as it is utilized in the reaction and for constantly removing the reaction by-products as rapidly as they are formed. Contact of these by-products with the material being treated is thus kept to a minimum.

Although applicable to numerous types of processes, the invention is particularly useful in the treatment of fabrics and the like with organo silicon halides, such as disclosed in United States Patents Nos. 2,306,222; 2,782,090; and 2,824,778. In these processes the fabric is contacted with vapors of an organo silicon halide to form a water repellent silicone component together with by-product vapors of a hydrogen halide. It is generally desirable that the exposure of the material to the hydrogen halide be kept to a minimum since the vapors are frequently deleterious or otherwise objectionable. The practice has been to neutralize the hydrogen halide for instance by immersing the fabric in a mildly alkaline bath immediately following the exposure. Although this is generally satisfactory, an inherent difficulty with neutralization techniques lies in the fact that the water repellent nature of the fabric after the treatment with the organo silicon halide tends to impede the entry of a neutralizing solution. Best results have been obtained when the fabric is agitated in the neutralizing bath and when wetting agents are also incorporated to counteract the water repellent nature of the treated material.

The instant invention is based on maintaining the by-product vapor concentration within the treating chamber at an absolute minimum such that during the exposure itself there is a lesser amount of vapor in contact with the material. This is accomplished by providing an enclosed treating zone through which the vapors of the treating reagent mixed with an inert carrier gas are caused to flow while a length of the material to be treated is passed in continuously through the zone. Downstream from the reaction zone the spent vapors, including the by-product vapors, are exhausted from this system, and if desired, further processed for the recovery of whatever values they may contain. In this process the by-product materials are constantly removed from the reaction zone as rapidly as they are formed without any opportunity for an appreciable buildup in their concentration. The material is thus exposed to a relatively high concentration of the treating reagent and to a minimal concentration of the reaction by-products. Preferably the treating reagent is introduced into the chamber as an aerosol dispersion of liquid particles in the inert gas so that as the vapor component is used up additional vapor is generated by evaporation of the liquid particles.

An additional degree of uniformity of the treatment appears to be realized when the gaseous reactant mixture is caused to flow upwardly through the treating zone in a uniform manner and the material to be treated is fed in a flat sheet-like arrangement, e.g. as a fabric, web or sheet-like array of fibers or filaments, through the zone with every line transverse to its direction of travel lying horizontally. The uniform upward flow of the reactant mixture is believed to create highly uniform conditions at each horizontal level within the zone and by maintaining the material horizontal in its transverse direction, every bit is passed through the same sequence of levels and is accordingly treated under substantially identical conditions. The passage of material in this manner is most easily provided for by feeding it through the reaction zone over horizontal rollers or rods.

The apparatus of this invention includes a generally enclosed treating chamber having a lower inlet and distribution portion, an intermediate reaction zone, and an upper exhaust port. The mixture of reagent and inert gas is introduced, as by a conventional atomizer spray head into the lower portion, while the material to be treated is passed continuously through the intermediate reaction zone. The gaseous mixture is thus caused to flow upwardly past the material, and reaction by-products generated during the treatment are carried away as they are formed. The by-products and spent gases and vapors are finally removed from the system through the upper exhaust port.

In the preferred embodiment wherein the reactant reagent is introduced as an aerosol dispersion of droplets suspended in the inert gas, the chemicals are most desirably fed at a rate proportionate to the rate of travel of the length of material travelling through the reaction zone. The preferred embodiment accordingly features a metering device which controls the delivery of the reagent and operates in response to a rate integrating system operatively associated with the material being treated.

The preferred embodiment of the invention, together with other advantages and features are described in detail below with reference to the accompanying drawing in which:

FIG. 1 is a schematic flow sheet showing a complete system for processing a length of material, such as a fabric, in accordance with this invention;

FIG. 2 is a side elevation in cross-section showing a treating chamber for treating a fabric in accordance with this invention;

FIG. 3 is a fragmentary plan view of a perforated baffle plate which separates the lower portion of the chamber from the reaction zone; and FIG. 4 is a plan view of the apparatus partly in section taken at 4—4 in FIG. 2.

A typical embodiment of this invention designed for the treatment of continuous lengths of fabric or similar sheet material with organo halogeno silanes is shown in the accompanying drawing. The fabric 1 to be treated is fed continuously into and through a treating zone within a treating chamber 2 while vapors of the silane are introduced into a lower portion of the chamber through an inlet header 3. The silane together with an inert gas carrier, e.g. air, are supplied to the header 3 through a pair of conventional spray nozzles 4 to form an aerosol mixture of liquid particles of the silane dispersed in the mixture of gas and silane vapors. From the outlet of the header, the aerosol mixture enters the bottom of the chamber 2 and flows in a generally upward direction through the reaction zone where the silane vapors come into contact with the material being treated. In the course of this treatment, the silane is hydrolyzed to form a water repellent silicone and hydrogen halide as a reaction by-product. The spent gases, including the hydrogen halide, are constantly removed from the chamber through an exhaust port 5 provided in the top of the chamber.

In this system the treatment is carried out with a substantially constant and uniform concentration of silane vapors and a constantly controlled low concentration of reaction by-products. By introducing the silane in the form of an aerosol dispersion of liquid particles in a gas, the vapor concentration of the mixture is maintained substantially constant and uniform as long as dispersed liquid droplets are present and all the material is accordingly brought into contact with a gaseous reactant composition of substantially the same vapor concentration throughout. By introducing the mixture of reactants at the bottom of the chamber and causing it to flow upwardly through the chamber, any tendency for the development of non-uniform conditions, as through settling of particles, convection of vapors or other localized mass movement of part of the reagent and gas mixture is largely avoided. The mixture rather enters in more or less even flow across the bottom of the chamber. Since the silane vapors and particles are both heavier than the carrier gas, they tend to remain at the bottom of the chamber, but the continued introduction of gaseous reactants forces the mixture upwardly in a controlled and uniform manner into the higher reaction zone portion of the chamber. As the reactant mixture passes through the reaction zone, the concentration of reaction by-products builds up in the mixture and the amount of liquid in the dispersed phase is reduced. The controlled upward flow, however, brings about substantially uniform conditions throughout each horizontal level within the reaction zone. When the material to be treated is passed through the reaction zone in sheet form with every line transverse to its direction of travel lying horizontally, every part of the material is treated under substantially identical conditions.

In the course of the reaction, hydrogen halide by-products are formed which are generally lighter than the gaseous reactant mixture and they consequently tend to follow along with the motion of the gaseous mixture without accumulating in the reaction zone. In this manner, it is possible to maintain both the average and the maximum concentration of by-product gases at an extremely low value. The deleterious and other objectionable effects of these by-products is thus held to a minimum.

By way of example, a chamber designed for treating pile cotton and rayon fabrics weighing 1 lb. 10 ozs. per yard at the rate of 10 yards per minute will typically be supplied with air as the atomizing gas at the rate of 60 cu. ft. per minute and with a mixture of methyl chloro silanes, consisting chiefly of dimethyl dichloro silane and methyl trichloro silane, at the rate of .33 lb. per minute (about 2 percent of the weight of the fabric). The spent gas mixture will have a maximum hydrogen chloride concentration of about 3 percent by volume. In general it has been observed that deleterious effects of hydrogen chloride on cellulosic fabrics such as cotton, rayon and acetate, are not serious as long as the hydrogen halide concentration is maintained at less than about 10 percent by volume. Operation within these limits is readily achieved in the system of this invention.

The reaction chamber 2 is suitable in the form of a low rectangular enclosure having at the bottom an inlet opening 3a which connects with the header 3 through which the aerosol mixture of reagent in inert gas is introduced. In the embodiment illustrated, the header 3 is in the form of a flat fanshaped cowl inclined slightly downwardly to direct the incoming gaseous mixture toward the bottom of the chamber, and the spray nozzles 4 are located in the narrow end chamber. Within the chamber 2 there is provided a horizontal perforated baffle extending inwardly from the top of the inlet opening 3a. The baffle 6 serves to prevent a direct blast of the incoming gases into the upper reaction zone and also helps distribute the flow across the bottom of the chamber 2 while permitting the diffusion of the reactant gas mixture upwardly through the perforations.

The reaction zone of the chamber 2 constitutes the portion generally above the baffle 6 and above that lower portion of the chamber into which the reactant gaseous mixture is initially distributed. The reaction zone is not a precisely defined or physically separated space but its generally that space through which the gas mixture is caused to flow after its initial introduction into the bottom of the chamber. The reaction zone is provided with means for introducing and removing the material to be treated in a continuous fashion such as rollers 7a, 7b, 7c and 7d over around which a fabric may be trained. The side walls of the chamber 2 adjacent to reaction zone are provided with suitable openings for introducing and removing the material. The illustrated embodiment these openings are in the form of long horizontal slots 8 and 9. The fabric enters through the upper slot 8, traverses the reaction zone and passes around vertically spaced horizontal rollers 7a and 7b, then again traverses the reaction zone at a lower level and passes around roller 7c then crosses to roller 7d from which a final traverse is made to the lower slot 9 through which the material leaves the chamber.

The respective supplies of reagent and gas are introduced into the chamber through conventional atomizing devices in which a liquid may be dispersed as an aerosol in a stream of gas. As shown in FIG. 1 conduits 16 and 18 deliver the air and reagent to the nozzles 4 from a compressed air supply line 20 and from a chemical storage tank 22.

The air is passed through one of a pair of parallel dryers 24 (one of which is on stream while the other is being replenished) and then through a regulating valve 26 by which the pressure of the air supply to the spray nozzles 4 may be regulated. The reagent from the tank 22 is passed through a sediment bowl 25 in which suspended foreign material is separated, and is then pumped by means of an air operated pump 26 to the spray nozzles 14 through an accumulator 27, to eliminate the pulsations of the pump, and through a rotameter 28.

The reagent is preferably supplied at a rate proportional to the rate at which the material being treated is passed through the chamber 2. For this purpose the roller 7a is utilized to drive a cam 30 which closes a pair of electrical contacts 32 once each revolution. The circuit made through the contacts 32 controls the energization of a solenoid actuated air valve 34, which in turn controls the supply of air to the operating cylinder 33 of the air operated pump 26. Thus a stroke of the piston is made each time the valve 34 is actuated. The pump is preferably one of variable displacement such that the proper proportion of reagent for the material being treated may be delivered to the chamber 2. Since the rate of pumping is controlled from the roller 7a over which the material being treated passes, the proper amount of reagent is supplied to the chamber 2 regardless of the rate at which the material is to be treated.

The spray nozzles 4 are typically of the type provided with an air operated valve through which the reagent to be sprayed must pass, so that in the event of a failure of air pressure the supply of reagent to the system will be shut off. Air lines 35 and 36 which are fed from a feeder line 37 supply air for operating this control valve from the air supply line 20. This air supply is fed through a solenoid operated valve 38 which is operated through a circuit controlled by a pressure switch 39 located in the atomizing air line 16. Thus the supply of air to the control valve in the spray nozzles 14 is provided only when proper air pressure is in the atomizing air line 16, and upon failure of either air supply the control valve is caused to close.

From the foregoing description of the preferred embodiment of the system of this invention it will be seen that it lends itself to completely automatic operation and requires a minimum of supervision and maintenance. Once the proper adjustments are made for a given treatment of a given material the operation simply involves the passing of the material through the chamber.

The invention has been described with particular reference to the treatment of fabrics with organo silicon halides, but it should be appreciated that other material available in continuous lengths may be similarly treated, such as paper, fibers and yarns. Several yarns or fibers may be treated simultaneously in the manner of treating a length of fabric by feeding them into and through the chamber simultaneously in a horizontal array. Because substantially uniform conditions are provided throughout any level within the reaction zone, all the yarns or fibers will be treated under substantially identical conditions regardless of their position within the array.

The system is particularly useful in the treatment of materials with organo halogenosilanes using air as a carrier gas because both the vapors and dispersed particles of silane are heavier than the air, and are thus moved uniformly upward by the motion of the gaseous mixture through the chamber, while the reaction by-product hydrogen halide is lighter than the reactant gaseous mixture and tends thus to move upwardly through it and away from the reaction zone. Since the same considerations will apply to numerous types of treatment, this invention may be used wherever the vapors of a reactant reagent are heavy and are introduced in an aerosol in a lighter inert gas, and where the reaction by-products include a lighter gas.

Having thus disclosed my invention and described in detail a preferred embodiment thereof I claim and desire to secure by Letters Patent:

1. The method of treating continuous lengths of material with an atmosphere comprising the vapor of a liquid reagent reactive with said material to form a reaction by-product lighter than said atmosphere comprising continuously introducing an aerosol dispersion of liquid particles of said reagent dispersed in a gas into a lower portion of a reaction chamber, thereby forming a gaseous reactant mixture comprising a mixture of said gas and vapors of said reagent having liquid particles of said reagent dispersed therein, and causing said reactant mixture to flow continuously upwardly within said chamber, continuously passing said material through a reaction zone within said chamber above said lower portion such that said material contacts the upward flow of said reactant mixture, and continuously exhausting spent reactant mixture from said chamber after its contact with said material, whereby the concentration of said reaction by-product is maintained at a minimum.

2. The method defined by claim 1 wherein the vapors of the reagent are heavier than the gas.

3. The method of treating continuous lengths of material with an atmosphere comprising the vapor of a liquid reagent reactive with said material to form a reaction by-product lighter than said atmosphere comprising continuously introducing an aerosol dispersion of liquid particles of said reagent dispersed in a gas into a lower portion of a reaction chamber, thereby forming a gaseous reactant mixture comprising a mixture of said gas and vapors of said reagent having liquid particles of said reagent dispersed therein, and causing said reactant mixture to flow continuously upwardly within said chamber, continuously passing said material in a generally horizontal direction through said chamber at a location above said lower portion such that said material contacts the upward flow of said reactant mixture, and continuously exhausting spent reactant mixture from said chamber after its contact with said material, whereby the concentration of said reaction by-product is maintained at a minimum.

4. The method of treating continuous lengths of material with an atmosphere comprising the vapor of a liquid reagent reactive with said material to form a reaction by-product lighter than said atmosphere comprising continuously introducing an aerosol dispersion of liquid particles of said reagent dispersed in a gas into a lower portion of a reaction chamber, thereby forming a gaseous reactant mixture comprising a mixture of said gas and vapors of said reagent having liquid particles of said reagent dispersed therein, and causing said reactant mixture to flow continuously upwardly within said chamber, continuously passing said material in a generally flat sheet-like arrangement with every line transverse to its direction of travel lying horizontally through said chamber at a location above said lower portion such that said material contacts the upward flow of said reactant mixture, and continuously exhausting spent reactant mixture from said chamber after its contact with said material, whereby the concentration of said reaction by-product is maintained at a minimum.

5. The method of treating continuous lengths of material with an atmosphere comprising the vapor of a liquid reagent reactive with said material to form a reaction by-product lighter than said atmosphere comprising continuously introducing an aerosol dispersion of liquid particles of said reagent dispersed in a gas into a lower portion of a reaction chamber, thereby forming a gaseous reactant mixture comprising a mixture of said gas and vapors of said reagent having liquid particles of said reagent dispersed therein, and causing said reactant mixture to flow continuously upwardly within said chamber, continuously passing said material disposed in a generally flat sheet-like arrangement with every line transverse to its direction of travel lying horizontally and in a generally horizontal direction through said chamber repeatedly at different levels therein at a location above said lower portion such that said material contacts the upward flow of said reactant mixture, and continuously exhausting spent reactant mixture from said chamber after its contact with said material, whereby the concentration of said reaction by-product is maintained at a minimum.

6. The method of treating continuous lengths of material with an atmosphere comprising the vapor of a reagent reactive with said material to form a reaction by-product lighter than said atmosphere, comprising continuously introducing said atmosphere into a lower portion of a reaction chamber and causing said atmosphere to flow continuously upwardly within said chamber, continuously passing said material through a reaction zone within said chamber above said lower portion such that said atmosphere is caused to contact and react with said material with the production of reaction by-product, and continuously exhausting atmosphere from said chamber from above said reaction zone to remove the reaction by-product as rapidly as it is formed, whereby the concentration of reaction by-product within said chamber is maintained at a minimum.

7. The method of treating continuous lengths of material with an atmosphere comprising the vapor of a reagent reactive with said material to form a reaction by-product lighter than said atmosphere, comprising continuously introducing said atmosphere into a lower portion of a reaction chamber and causing said atmosphere to flow continuously upwardly within said chamber, continuously passing said material in a generally flat sheet-like arrangement with every line transverse to its direction of travel lying substantially horizontally through a reaction zone within said chamber above said lower portion such that said atmosphere is caused to contact and react with said material with the production of reaction by-product, and continuously exhausting atmosphere from said chamber from above said reaction zone to remove the reaction by-product as rapidly as it is formed, whereby the concentration of reaction by-product within said chamber is maintained at a minimum.

References Cited in the file of this patent

UNITED STATES PATENTS

| | | |
|---|---|---|
| 119,187 | Simonin | Sept. 19, 1871 |
| 2,306,222 | Patnode | Dec. 22, 1942 |
| 2,694,963 | MacDonald | Nov. 23, 1954 |
| 2,736,289 | Allen | Feb. 28, 1956 |